(12) United States Patent
Gill

(10) Patent No.: US 7,057,837 B2
(45) Date of Patent: Jun. 6, 2006

(54) FLUX CLOSED SINGLE POLE PERPENDICULAR HEAD FOR ULTRA NARROW TRACK

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 101 days.

(21) Appl. No.: 10/273,603

(22) Filed: Oct. 17, 2002

(65) Prior Publication Data

US 2004/0075927 A1    Apr. 22, 2004

(51) Int. Cl.
G11B 5/02 (2006.01)

(52) U.S. Cl. ....................................... 360/55

(58) Field of Classification Search .................. 360/55, 360/75, 46, 125, 126, 123, 124, 122, 119, 360/317, 318; 428/611; 29/603.07, 603.14
See application file for complete search history.

(56) References Cited

U.S. PATENT DOCUMENTS

| | | | |
|---|---|---|---|
| 4,762,755 A | 8/1988 | Shiiki et al. | |
| 4,814,921 A | 3/1989 | Hamakawa et al. | |
| 4,935,311 A | 6/1990 | Nakatani et al. | |
| 5,032,945 A | 7/1991 | Argyle et al. | |
| 5,313,356 A | 5/1994 | Ohkubo et al. | |
| 5,663,857 A | 9/1997 | Kumura et al. | |
| 2003/0197976 A1* | 10/2003 | Van der Heijden et al. | 360/125 |

FOREIGN PATENT DOCUMENTS

| | | |
|---|---|---|
| JP | 57-117119 | 7/1982 |
| JP | 60-057515 | 4/1985 |
| JP | 60-136007 | 7/1985 |
| JP | 1-283907 | 11/1989 |
| JP | 5-29172 | 2/1993 |
| JP | 7-135111 | 5/1995 |

* cited by examiner

Primary Examiner—David Hudspeth
Assistant Examiner—Glenda P. Rodriguez
(74) Attorney, Agent, or Firm—William D. Gill; Rambod Nader (57) ABSTRACT

A single pole perpendicular write head is provided comprising an inductive write head pole structure comprising a layered structure alternating a plurality of ferromagnetic layers with a plurality of antiparallel coupling layers to form an antiparallel coupled ferromagnetic stack. The antiparallel coupling of the ferromagnetic layers when the head is not writing forms a flux closed magnetic configuration of the write pole resulting in reduction or elimination of stray remanence fields at the pole tip region that may cause unwanted data erasure at the disk surface.

16 Claims, 6 Drawing Sheets

FLUX CLOSED SINGLE POLE PERPENDICULAR HEAD FOR ULTRA NARROW TRACK

BACKGROUND OF THE INVENTION

1. Field of the Invention

This invention relates to magnetic transducers particularly applicable to magnetic disk drive systems. More particularly, the invention relates to thin film inductive read/write heads for ultra high density recording using a flux closed write pole structure to minimize the remanence field of the pole.

2. Description of the Related Art

Thin film magnetic read/write heads are used for reading and writing magnetically coded data stored on a magnetic storage medium such as a magnetic disk or a magnetic tape. There is a continuing strongly-felt need for increasing the data storage density in such media. Most efforts to increase magnetic storage density involve techniques for increasing the areal bit density in the magnetic medium.

In rotating magnetic disk drives, the areal density is the product of the number of flux reversals per millimeter along a data track and the number of tracks available per millimeter of disk radius. Thus, high areal data storage density requires recording heads with high linear resolution and narrow track width.

A thin film inductive write head includes one or more coil layers imbedded in an insulation stack, the insulation stack being sandwiched between first and second pole piece layers. A write gap is formed in a pole tip region by provision of a gap layer between the pole pieces. The pole pieces are magnetically coupled in a back region. Between the pole tip region and the back gap region is a yoke region where the pole piece layers separate from one another to accommodate the insulation stack. The insulation stack typically includes a first insulation layer (I1) on the first pole piece layer, one or more coil layers on the first insulation layer, an additional insulation layer (I2) over the coil layer.

A combined head, such as a merged magnetoresistive (MR) head, includes the aforementioned write head as a write head portion combined with an MR read head portion. The MR read head portion includes an MR sensor which is sandwiched between first and second gap layers which are in turn sandwiched between first and second shield layers. In a merged MR head, a single layer serves a double function as a second shield layer for the read head and as a first pole piece for the write head. The combined head is carried on a slider which, in turn, is mounted on a suspension in a magnetic disk drive. The suspension is mounted on an actuator which moves the combined head over selected tracks on a rotating disk for reading and writing signals thereon. As the disk rotates a cushion of air is developed to provide an air bearing between the disk and the slider which counterbalances a loading force exerted by the suspension. A surface of the slider facing the disk is called an air bearing surface (ABS) and is typically spaced from the disk on the order of 0.02 μm when the disk is rotating.

Future high data rate, high efficiency, inductive thin film write heads will need to write data tracks having track widths of sub-micron dimensions. For very narrow track width, write poles begin to exhibit a large remanence field when the write current is off which can result in erasure of written bits. Accordingly, there is a need to provide a write pole structure having very low or zero remanence to meet the requirements of future high density magnetic recording heads.

SUMMARY OF THE INVENTION

It is an object of the present invention to disclose a pole structure for a magnetic write pole in an inductive write head having zero or near zero remanence field with the write current off.

It is another object of the present invention to disclose a magnetic write pole for an inductive write head having a layered structure comprising a plurality of antiparallel (AP) coupled ferromagnetic layers.

It is yet another object of the present invention to disclose a perpendicular recording inductive write head having a write pole formed of a plurality of AP-coupled ferromagnetic layers.

In accordance with the principles of the present invention, there is disclosed an inductive write head pole structure comprising a layered structure alternating a plurality of ferromagnetic layers with a plurality of antiparallel coupling (APC) layers to form an AP-coupled ferromagnetic stack. In a first embodiment, a single write pole of a perpendicular recording write head is formed of an AP-coupled ferromagnetic stack.

The AP-coupled layer structure of the write pole of the invention provides a solution to a erasure problem observed in narrow track width (less than about 150 nm) write heads for high data density recording applications. As the track width is reduced to achieve the desired high track densities, a relatively large remanence field in single layer write pole structures causes erasure of previously written data as the write head passes over data during nonwrite operation.

The write pole structure formed of an AP-coupled ferromagnetic stack provides a solution to the above described erasure problem because the net magnetization of the AP-coupled stack is zero or nearly zero due to formation of a flux closed magnetic configuration resulting in cancellation of the alternating antiparallel directed magnetizations of the individual ferromagnetic layers in the stack. Cancellation of the remanent magnetizations of the individual layers eliminates stray remanence fields causing erasures.

During a write operation, a write current in a write coil induces a strong unidirectional magnetic flux in the write pole that overcomes the antiparallel coupling of the layers forming the AP-coupled ferromagnetic stack of the write pole resulting in ferromagnetic coupling of the stack. In this manner, the ferromagnetic layers forming the write pole are ferromagnetically coupled when the write coil current is "on" (writing) and are antiparallel coupled when the write current is "off" (no writing).

The above as well as additional objects, features, and advantages of the present invention will become apparent in the following detailed description.

BRIEF DESCRIPTION OF THE DRAWINGS

For a fuller understanding of the nature and advantages of the present invention, as well as of the preferred mode of use, reference should be made to the following detailed description read in conjunction with the accompanying drawings. In the following drawings, like reference numerals designate like or similar parts throughout the drawings.

FIG. 3b is an ABS view, not to scale, of the perpendicular write head of FIG. 3a;

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
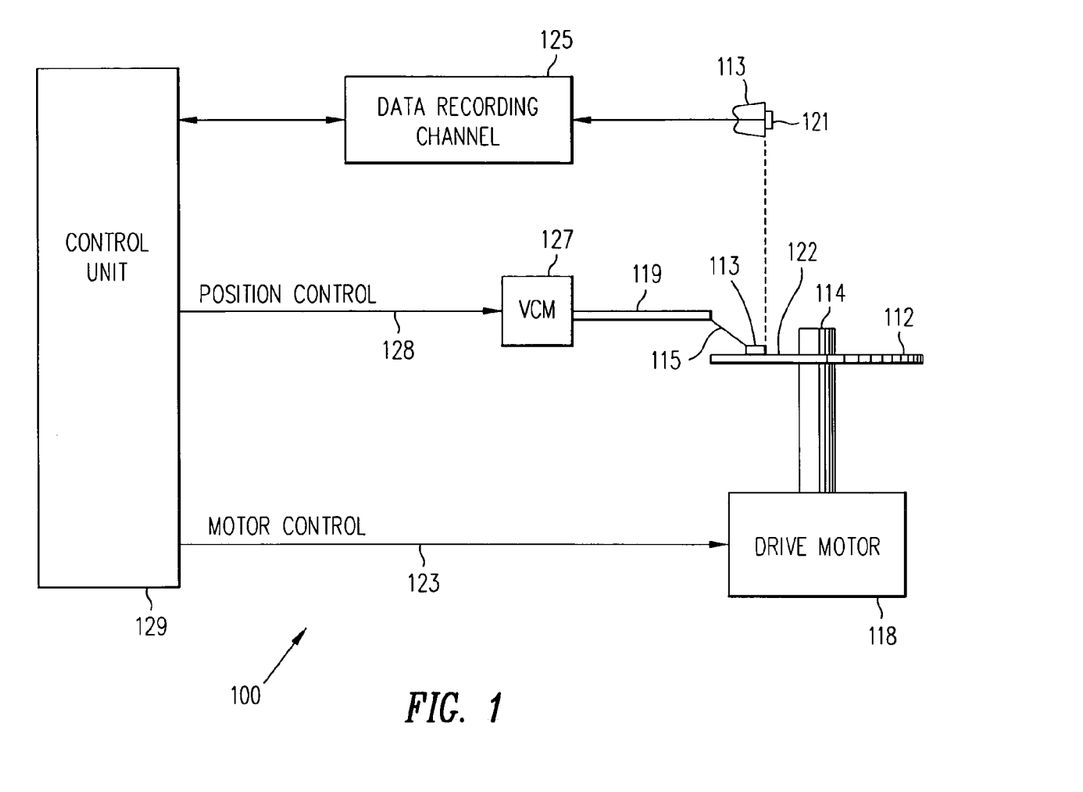
FIG. 1 is a simplified diagram of a magnetic recording disk drive system using the inductive write head of the present invention.

Referring now to FIG. 1, there is shown a disk drive 100 embodying the present invention. As shown in FIG. 1, at least one rotatable magnetic disk 112 is supported on a spindle 114 and rotated by a disk drive motor 118. The magnetic recording media on each disk is in the form of an annular pattern of concentric data tracks (not shown) on the disk 112.

At least one slider 113 is positioned on the disk 112, each slider 113 supporting one or more magnetic read/write heads 121 where the head 121 incorporates the magnetic read/write head of the present invention. As the disks rotate, the slider 113 is moved radially in and out over the disk surface 122 so that the heads 121 may access different portions of the disk where desired data is recorded. Each slider 113 is attached to an actuator arm 119 by means of a suspension 115. The suspension 115 provides a slight spring force which biases the slider 113 against the disk surface 122. Each actuator arm 119 is attached to an actuator 127. The actuator as shown in FIG. 1 may be a voice coil motor (VCM). The VCM comprises a coil movable within a fixed magnetic field, the direction and speed of the coil movements being controlled by the motor current signals supplied by a controller 129.

During operation of the disk storage system, the rotation of the disk 112 generates an air bearing between the slider 113 (the surface of the slider 113 which includes the head 121 and faces the surface of the disk 112 is referred to as an air bearing surface (ABS)) and the disk surface 122 which exerts an upward force or lift on the slider. The air bearing thus counterbalances the slight spring force of the suspension 115 and supports the slider 113 off and slightly above the disk surface by a small, substantially constant spacing during normal operation.

The various components of the disk storage system are controlled in operation by control signals generated by the control unit 129, such as access control signals and internal clock signals. Typically, the control unit 129 comprises logic control circuits, storage chips and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the disk 112. Read and write signals are communicated to and from the read/write heads 121 by means of the recording channel 125. Recording channel 125 may be a partial response maximum likelihood (PRML) channel or a peak detect channel. The design and implementation of both channels are well known in the art and to persons skilled in the art. In the preferred embodiment, recording channel 125 is a PRML channel.

The above description of a typical magnetic disk storage system, and the accompanying illustration of FIG. 1 are for representation purposes only. It should be apparent that disk storage systems may contain a large number of disks and actuator arms, and each actuator arm may support a number of sliders.

Figure 2:
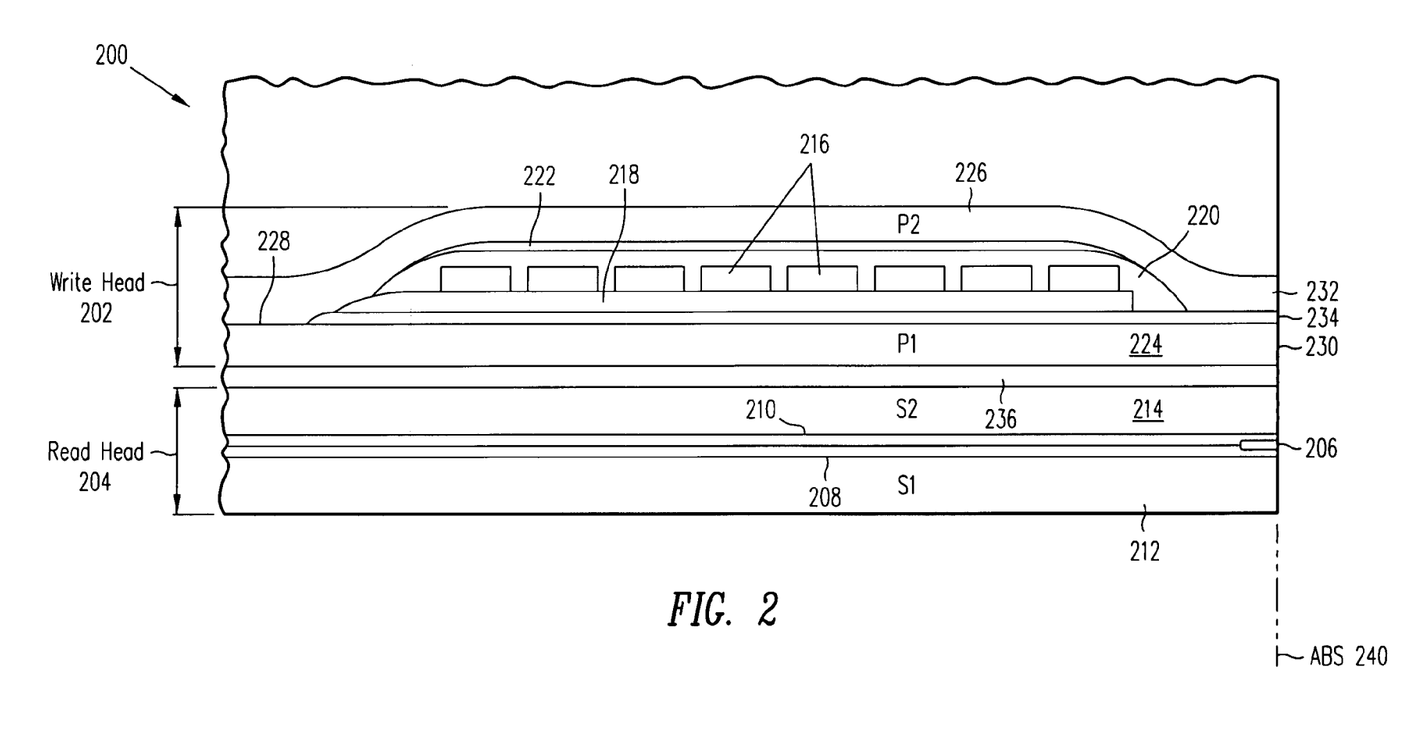
FIG. 2 is a vertical cross-section, not to scale, of a "piggyback" read/write magnetic head.

FIG. 2 is a side cross-sectional elevation view of a "piggyback" magnetic read/write head 200, which includes a write head portion 202 and a read head portion 204, the read head portion employing a magnetoresistive (MR) sensor 206. The MR sensor 206 is sandwiched between non-magnetic insulative first and second read gap layers 208 and 210, and the read gap layers are sandwiched between ferromagnetic first and second shield layers 212 and 214. In response to external magnetic fields, the resistance of the MR sensor 206 changes. A sense current $I_s$ conducted through the sensor causes these resistance changes to be manifested as potential changes. These potential changes are then processed as readback signals by the processing circuitry of the data recording channel 146 shown in FIG. 1.

The write head portion 202 of the magnetic read/write head 200 includes a coil layer 216 sandwiched between first and second insulation layers 218 and 220. A third insulation layer 222 may be employed for planarizing the head to eliminate ripples in the second insulation layer 220 caused by the coil layer 216. The first, second and third insulation layers are referred to in the art as an insulation stack. The coil layer 216 and the first, second and third insulation layers 218, 220 and 222 sandwiched between first and second pole piece layers 224 and 226. The first and second pole piece layers 224 and 226 are magnetically coupled at a back gap 228 and have first and second pole tips 230 and 232 which are separated by a write gap layer 234 at the ABS 240. An insulation layer 236 is located between the second shield layer 214 and the first pole piece layer 224. Since the second shield layer 214 and the first pole piece layer 224 are separate layers this read/write head is known as a "piggyback" head.

A perpendicular recording read/write head according to a first embodiment of the invention is now described with reference to FIGS. 3a–c and FIG. 4. The read/write head comprises a read head portion 301 and a write head portion 300 separated by an insulation layer 340. The read head 301 includes a magnetoresistive read sensor 334 sandwiched between first and second insulator layers 336 and 338 which are in turn sandwiched between first and second shield layers (S1 and S2) 330 and 332. The write head 300 comprises a single write pole P1 302, a flux closure pole P2 304 and a write coil 308. The poles P1 302 and P2 304 are magnetically coupled at a back gap 308 and have first and second pole tips 303 and 305 at the ABS. The write coil 308, preferably a pancake coil as well known to the art, is sandwiched between first and second insulation layers 320 and 322 which, in turn, are sandwiched between P1 302 and P2 304.

Figure 3A:
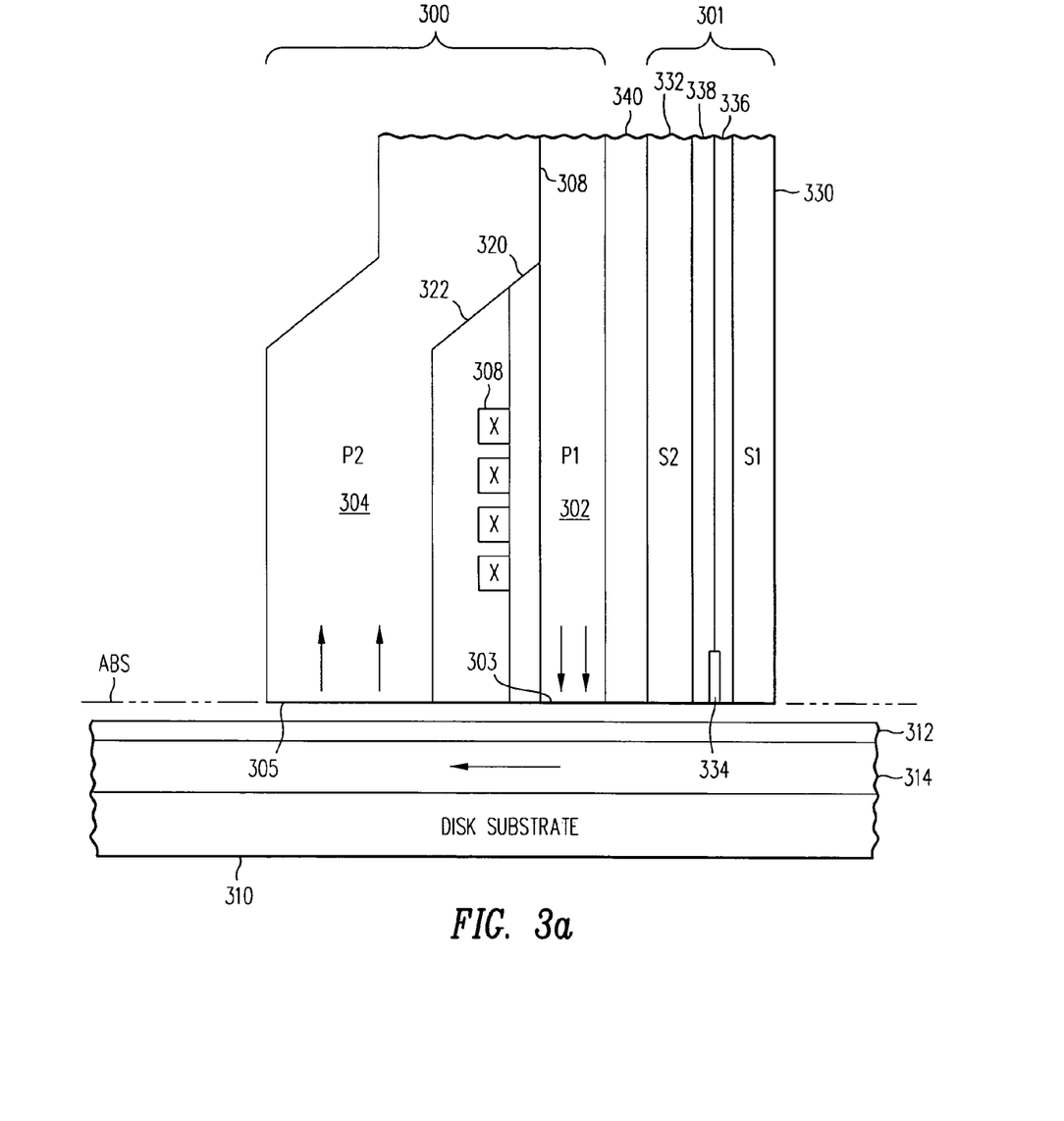
FIG. 3a is a vertical cross-section, not to scale, of a perpendicular read/write head.
Figure 3B:
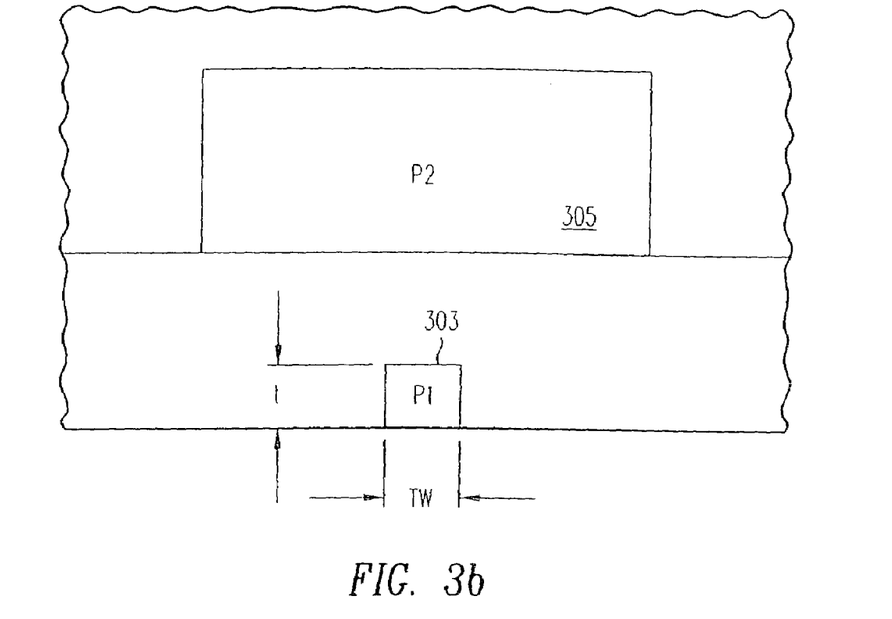
Figure 3C:
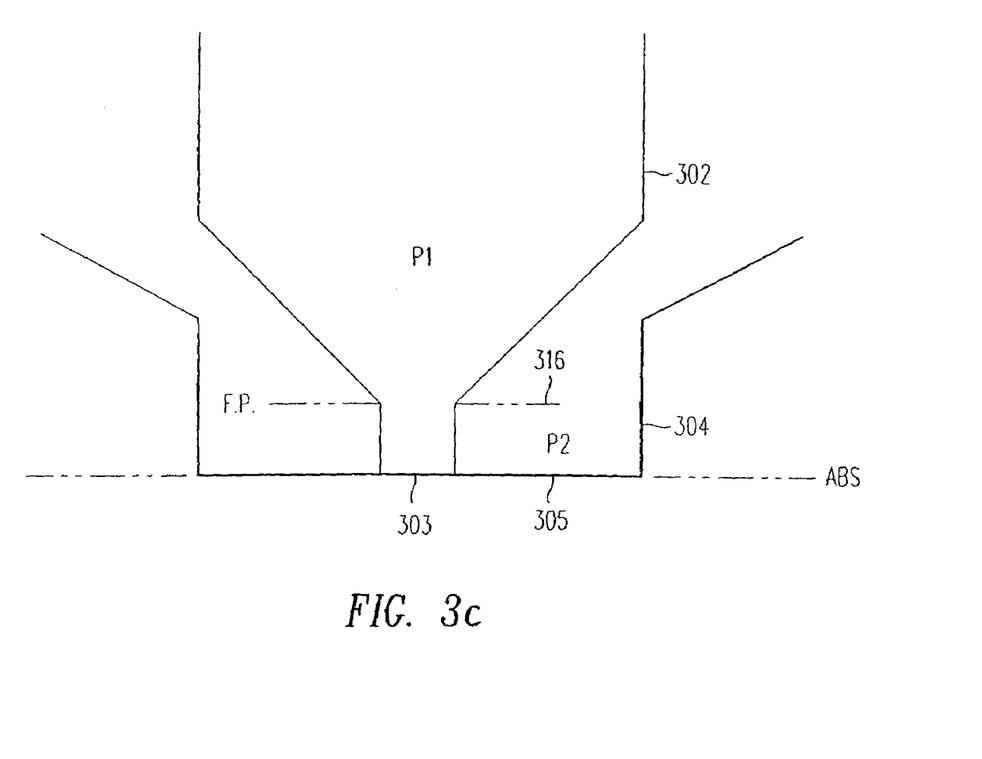
FIG. 3c is a plan view, not to scale, of the write pole of the perpendicular write head of FIG. 3b.

Near the ABS, write pole P1 302 narrows to form the first pole tip 303 which defines the track width (TW) for writing data on the magnetic media layer 312 on a magnetic disk 310. The narrow pole tip region at the ABS extends to a region recessed from the ABS referred to as the flare point 316. To facilitate flux closure for the perpendicular recording write head 300 during a write operation, a flux closure layer 314 of soft ferromagnetic material under media layer 312 may be provided to conduct magnetic flux from the region under the narrow write pole tip 303 to the region under the much wider and thicker second pole tip 305 of the flux closure pole P2 404.

Figure 4:
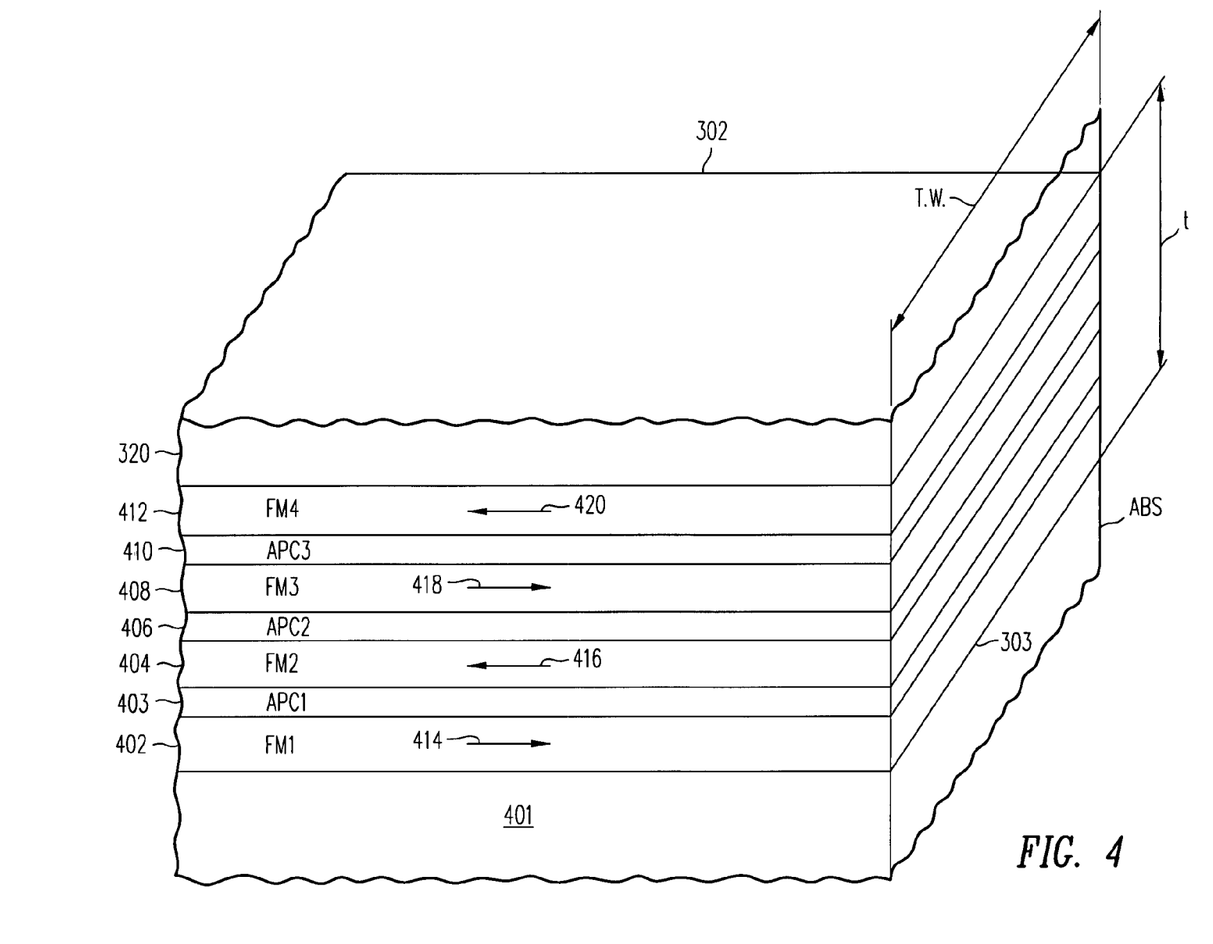
FIG. 4 is a perspective view, not to scale, of the layer structure of a perpendicular write head.

FIG. 4 is a perspective view of the write pole 302 showing an exemplary layered structure of the write pole of the present invention. The thickness (t) of the write pole 302 is built up from a plurality of ferromagnetic (FM) layers interleaved with a plurality of antiparallel coupling (APC) layers. In the exemplary structure of FIG. 4, four (4) FM layers are interleaved with three (3) APC layers. First APC layer (APC1) 403 is sandwiched between first ferromagnetic layer (FM1) 402 and second ferromagnetic layer (FM2) 404 and provides antiparallel coupling between FM1 and FM2. Second APC layer (APC2) 406 is sandwiched between second ferromagnetic layer (FM2) 404 and third ferromagnetic layer (FM3) 408 and provides antiparallel coupling between FM2 and FM3. Third APC layer (APC3) 410 is sandwiched between third ferromagnetic layer (FM3) 408 and fourth ferromagnetic layer (FM4) 412 and provides antiparallel coupling between FM3 and FM4. The antiparallel coupling between the FM layers results in the magnetizations 414 and 416 being directed in an opposite (antiparallel) direction to magnetizations 418 and 420 resulting in a zero or nearly zero net magnetization for the layered write pole 302 in the absence of a write current induced magnetic flux in the write head 300.

The write pole 302 may be fabricated in a magnetron sputtering or an ion beam sputtering system to sequentially deposit the multilayer structure shown in FIG. 4. The FM1 layer 402 of Co—Fe, or alternatively other Co-based ferromagnetic materials, having a thickness in the range of 20–100 Å is deposited on the substrate 401. The APC1 layer 403 of ruthenium (Ru), or alternatively of iridium (Ir), having a thickness in the range of 4–10 Å deposited on the FM1 layer 402. Subsequent FM layers 404, 408, 412 of Co—Fe and APC layers 406, 410 of Ru are deposited alternately to form the FM1/APC1/FM2/APC2/FM3/APC3/FM4 stack of FIG. 4. Alternatively, if a layered structure having more than the four FM layers of the exemplary write pole are desired, the additional layers may be deposited in alternating order to achieve the desired stack structure. The number of FM layers that may be used is in the range of 2–20. The insulating layer 320 of alumina or other insulating material is deposited on FM4 412 to complete the layer structure of the exemplary write pole 302. Alternatively, the FM layers of the structure may be formed of iron (Fe), Fe—N or other Fe-based ferromagnetic materials. When Fe-based materials are used for the FM layers, it is preferable to use copper (Cu) or chromium (Cr) having a thickness in the range of 5–20 Å to form the APC layers.

Figure 5:
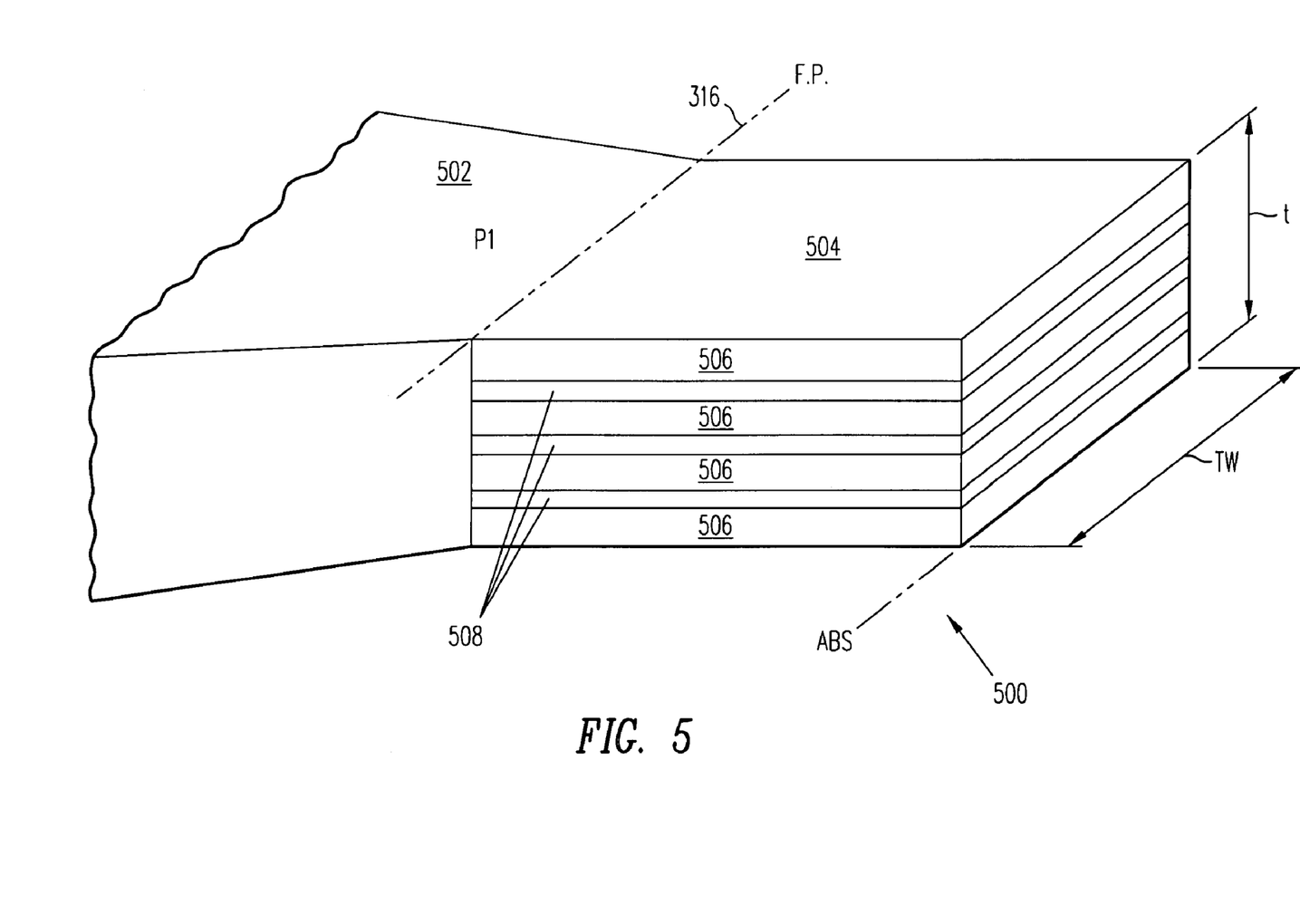
FIG. 5 is a perspective view, not to scale, of a write pole having a pole tip formed of a layered stack.

FIG. 5 depicts a write pole 500 of a perpendicular write head 300 according to second embodiment of the invention. With reference to FIGS. 3a–c and FIG. 5, the write pole 500 comprises a write pole P1 portion 502 extending from a back gap 308 to a flare point 316 recessed from the ABS and a pole tip 504 magnetically coupled to P1 502 at or near the flare point 316. P1 portion 502 is formed of a single layer of soft ferromagnetic material (for example, permalloy (Ni—Fe), or alternatively of a laminated stack of ferromagnetic layers as is known to the art. The pole tip 504 comprises a plurality of ferromagnetic (FM) layers 506 interleaved with a plurality of antiparallel coupling (APC) layers 508 having the same structure as the write pole 302 of the first embodiment of the invention shown in FIG. 4. The antiparallel coupling between the FM layers 506 results in a zero or nearly zero net magnetization for the layered pole tip 504 in the absence of a write current induced magnetic flux in the write head 300.

During a write operation, a write current in the write coil 308 induces a strong unidirectional magnetic flux in the write pole 502 is magnetically coupled to the pole tip 504. The current induced magnetic flux overcomes the antiparallel coupling of the layers forming the AP-coupled ferromagnetic stack of the pole tip 504 resulting in ferromagnetic coupling of the FM layers 506 of the stack. In this manner, the FM layers 506 forming the pole tip 504 are ferromagnetically coupled when the write coil current is "on" (writing) and are antiparallel coupled when the write current is "off" (no writing). The antiparallel coupling of the FM layers 506 when the head is not writing results in reduction or elimination of stray remanence fields at the pole tip region that may cause unwanted data erasure at the disk surface.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only as specified in the appended claims.

I claim:

1. A magnetic write head, comprising:
a coil layer sandwiched between first and second insulating layers;
a write pole adjacent to said first insulating layer, said write pole comprising a plurality of ferromagnetic layers interleaved with a plurality of antiparallel coupling layers, said write pole having a pole tip region at an air bearing surface (ABS) and extending from the ABS to a back gap; and
a flux closure pole adjacent to said second insulating layer, said flux closure pole extending from the ABS to the back gap, said flux closure pole magnetically coupled to the write pole at the back gap.

2. The magnetic write head as recited in claim 1 wherein the plurality of ferromagnetic layers are selected from a group of materials consisting of cobalt iron (Co—Fe), nickel iron (Ni—Fe), and iron nitride (Fe—N).

3. The magnetic write head as recited in claim 1 wherein said ferromagnetic layers each have a thickness in the range of 10–100 Å.

4. The magnetic write head as recited in claim 1 wherein the plurality of antiparallel coupling layers are selected from a group of materials consisting of chromium (Cr), ruthenium (Ru), iridium (Ir), and copper (Cu).

5. A magnetic write head, comprising:
a coil layer sandwiched between first and second insulating layers;
a write pole adjacent to said first insulating layer, said write pole, said write pole extending from a flare point region recessed from an air bearing surface (ABS) to a back gap;
a pole tip magnetically coupled to said write pole at said flare point region, said pole tip extending from the flare point region to the ABS, said pole tip comprising a plurality of ferromagnetic layers interleaved with a plurality of antiparallel coupling layers; and
a flux closure pole adjacent to said second insulating layer, said flux closure pole extending from the ABS to the back gap, said flux closure pole magnetically coupled to the write pole at the back gap.

6. The magnetic write head as recited in claim 5 wherein the plurality of ferromagnetic layers are selected from a group of materials consisting of cobalt iron (Co—Fe), nickel iron (Ni—Fe), and iron nitride (Fe—N).

7. The magnetic write head as recited in claim 5 wherein said ferromagnetic layers each have a thickness in the range of 10–100 Å.

8. The magnetic write head as recited in claim 5 wherein the plurality of antiparallel coupling layers are selected from a group of materials consisting of chromium (Cr), ruthenium (Ru), iridium (Ir), and copper (Cu).

9. A disk drive system, comprising:
   a magnetic recording disk;
   a magnetic read/write head for magnetically recording data on the magnetic recording disk and for sensing magnetically recorded data on the magnetic recording disk, said read/write head comprising:
      a write head comprising:
         a coil layer sandwiched between first and second insulating layers;
         a write pole adjacent to said first insulating layer, said write pole comprising a plurality of ferromagnetic layers interleaved with a plurality of antiparallel coupling layers, said write pole having a pole tip region at an air bearing surface (ABS) and extending from the ABS to a back gap; and
         a flux closure pole adjacent to said second insulating layer, said flux closure pole extending from the ABS to the back gap, said flux closure pole magnetically coupled to the write pole at the back gap;
      a read head comprising:
         first and second shield layers; and
         a magnetoresistive sensor sandwiched between said first and second shield layers; and
         an insulation layer disposed between the second shield layer of the read head and the write pole of the write head;
   an actuator for moving said magnetic read/write head across the magnetic disk so that the read/write head may access different regions of the magnetic recording disk; and
   a recording channel coupled electrically to the write head for magnetically recording data on the magnetic recording disk and to the magnetoresistive sensor of the read head for detecting changes of resistance of the magnetoresistive in response to magnetic fields from the magnetically recorded data.

10. The disk drive system as recited in claim 9 wherein the plurality of ferromagnetic layers are selected from a group of materials consisting of cobalt iron (Co—Fe), nickel iron (Ni—Fe), and iron nitride (Fe—N).

11. The disk drive system as recited in claim 9 wherein said ferromagnetic layers each have a thickness in the range of 10–100 Å.

12. The disk drive system as recited in claim 9 wherein the plurality of antiparallel coupling layers are selected from a group of materials consisting of chromium (Cr), ruthenium (Ru), iridium (Ir), and copper (Cu).

13. A disk drive system, comprising:
   a magnetic recording disk;
   a magnetic read/write head for magnetically recording data on the magnetic recording disk and for sensing magnetically recorded data on the magnetic recording disk, said read/write head comprising:
      a write head comprising:
         a coil layer sandwiched between first and second insulating layers;
         a write pole adjacent to said first insulating layer, said write pole, said write pole extending from a flare point region recessed from an air bearing surface (ABS) to a back gap;
         a pole tip magnetically coupled to said write pole at said flare point region, said pole tip extending from the flare point region to the ABS, said pole tip comprising a plurality of ferromagnetic layers interleaved with a plurality of antiparallel coupling layers; and
         a flux closure pole adjacent to said second insulating layer, said flux closure pole extending from the ABS to the back gap, said flux closure pole magnetically coupled to the write pole at the back gap;
      a read head comprising:
         first and second shield layers; and
         a magnetoresistive sensor sandwiched between said first and second shield layers; and
         an insulation layer disposed between the second shield layer of the read head and the write pole of the write head;
   an actuator for moving said magnetic read/write head across the magnetic disk so that the read/write head may access different regions of the magnetic recording disk; and
   a recording channel coupled electrically to the write head for magnetically recording data on the magnetic recording disk and to the magnetoresistive sensor of the read head for detecting changes of resistance of the magnetoresistive in response to magnetic fields from the magnetically recorded data.

14. The disk drive system as recited in claim 13 wherein the plurality of ferromagnetic layers are selected from a group of materials consisting of cobalt iron (Co—Fe), nickel iron (Ni—Fe), and iron nitride (Fe—N).

15. The disk drive system as recited in claim 13 wherein said ferromagnetic layers each have a thickness in the range of 10–100 Å.

16. The disk drive system as recited in claim 13 wherein the plurality of antiparallel coupling layers are selected from a group of materials consisting of chromium (Cr), ruthenium (Ru), iridium (Ir), and copper (Cu).

* * * * *